United States Patent [19]
Glassmeyer

[11] 3,871,702
[45] Mar. 18, 1975

[54] STAKE POST ARRANGEMENT FOR TRAILER

[75] Inventor: John J. Glassmeyer, Covington, Ky.

[73] Assignee: Pullman Incorporated, Chicago, Ill.

[22] Filed: Sept. 20, 1973

[21] Appl. No.: 399,033

[52] U.S. Cl.................................. 296/36, 296/104
[51] Int. Cl............................................ B62d 27/00
[58] Field of Search...... 296/28 M, 104, 36; 52/495, 52/282, 720, 731; 296/43

[56] References Cited
UNITED STATES PATENTS

| | | | |
|---|---|---|---|
| 3,126,224 | 3/1964 | Carter, Jr. et al................ | 296/28 M |
| 3,574,985 | 4/1971 | Pierce................................... | 52/495 |
| 3,692,354 | 9/1972 | Tuerk................................... | 296/36 |
| 3,780,481 | 12/1973 | Tomkins.............................. | 52/282 |
| 3,794,375 | 2/1974 | Woodward........................... | 296/36 |

Primary Examiner—Robert J. Spar
Assistant Examiner—Ross Weaver
Attorney, Agent, or Firm—Richard J. Myers

[57] ABSTRACT

In a trailer or truck of the convertible type from a flat deck to side wall and tarpaulin roof construction, a plurality of side stake posts, each post having an inner post member and an outer post member vertically slidably received in the inner post member in dovetailing fashion to define with the inner post member panel groove defining walls for receiving vertically extending wall panels to form the sides of the trailer, each inner post member and each outer post member further together forming a tarpaulin stake receiving pocket.

8 Claims, 6 Drawing Figures

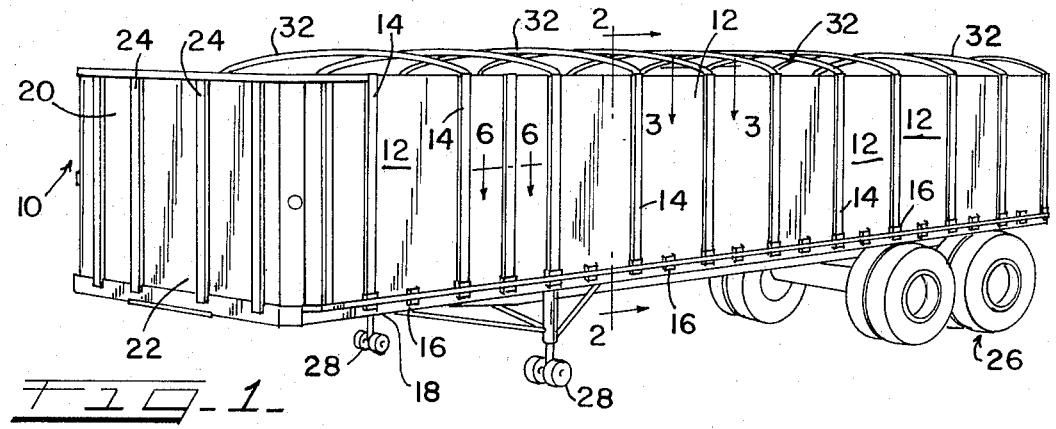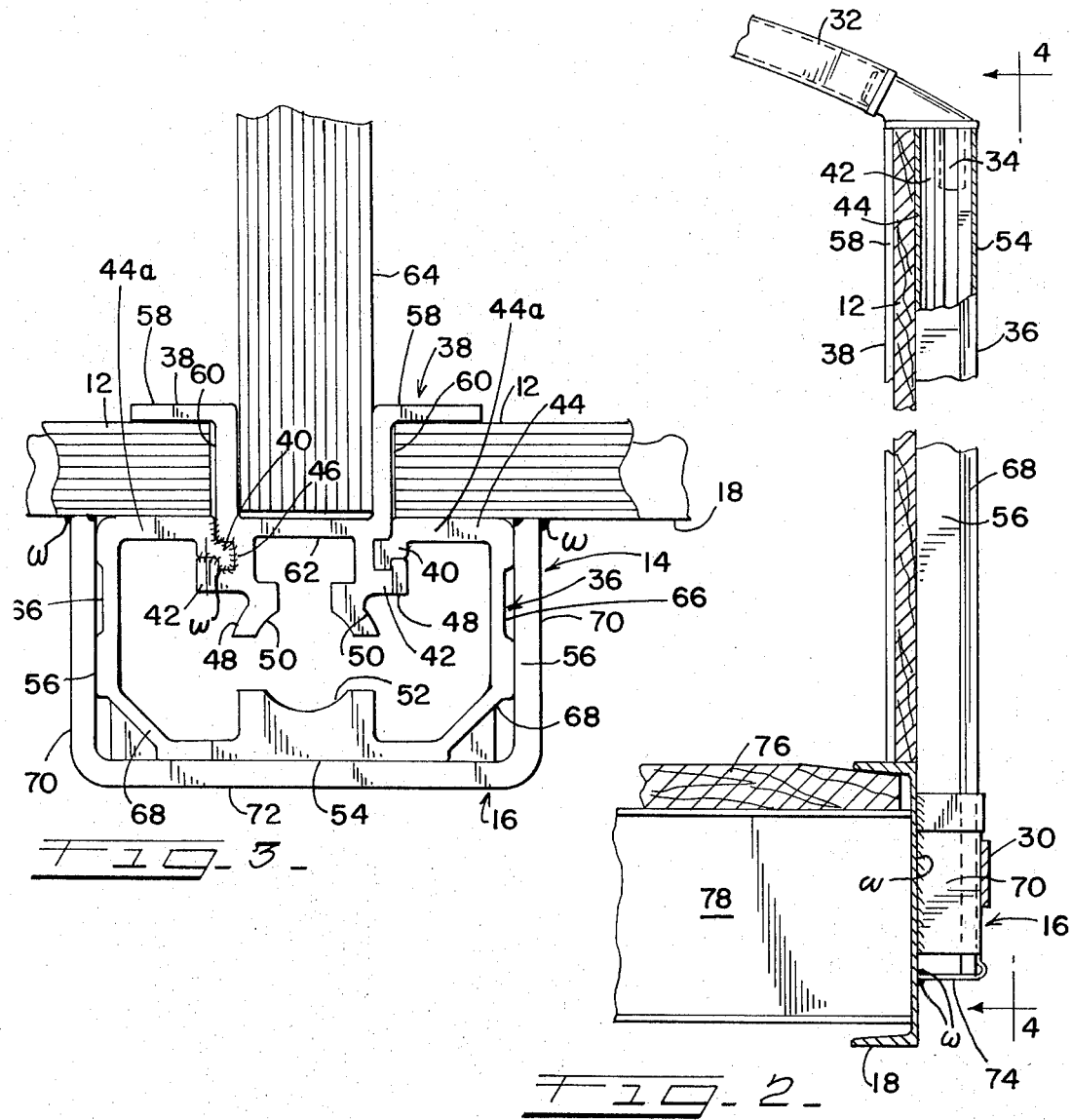

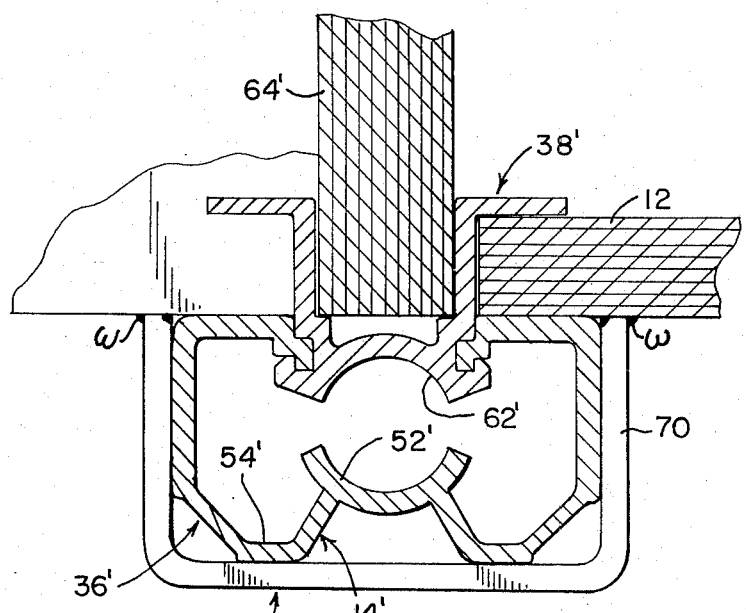
FIG. 4
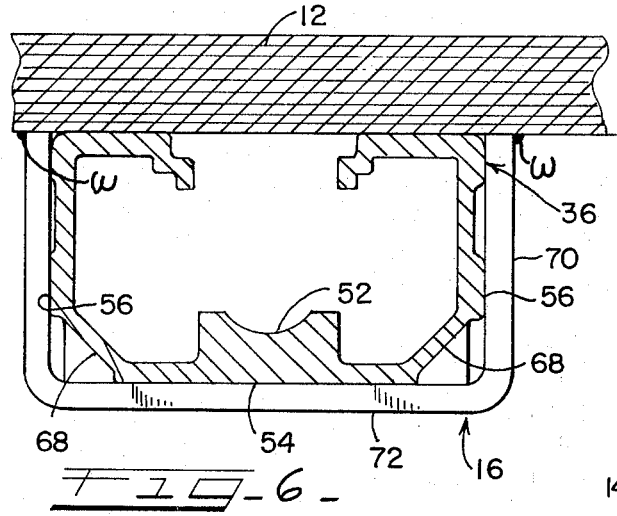
FIG. 6
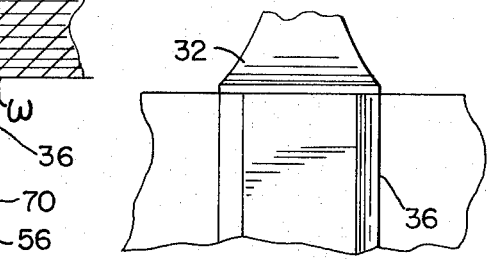
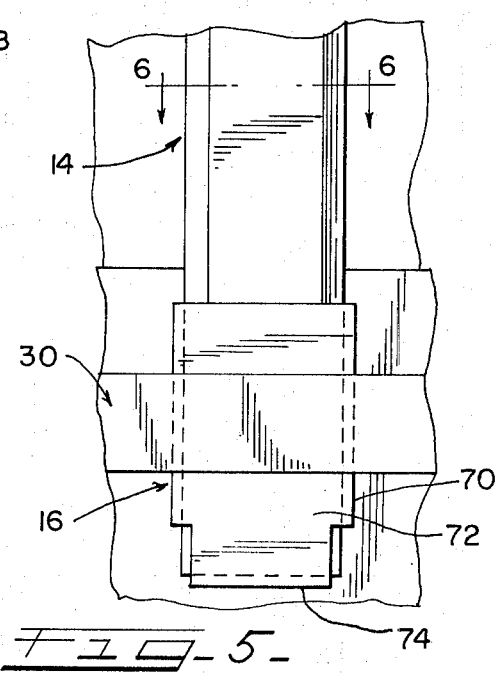
FIG. 5

STAKE POST ARRANGEMENT FOR TRAILER

BACKGROUND OF THE INVENTION

1. Field of the Invention

This invention relates to certain new and useful improvements in truck or trailer bodies adapted particularly for highway use, and more particularly for trailer bodies which may be converted to and from a platform bed condition from and to an enclosed semivan type condition where a tarpaulin roof construction is utilized along with sections of side walls.

2. Description of the Prior Art

Many trailer structures have been devised for highway use in order to transport cargo. Some of these trailer structures are flat beds with vertical side walls for containing the cargo. Several trailer structures have been devised having removable vertical stakes and associated panels. Three of these structures are disclosed in the following U.S. Pat. Nos. 3,097,880, 3,126,224, and 3,692,354. However, the problem with the prior art convertible trailer structures is that the tarpaulin stake post used was not readily adapted to be assembled on the walls of the trailer for supporting a tailgate board or for supporting an intermediate cargo divider while acting as a supporting post or, in the alternative, just acting as a supporting post. The present invention solves this problem by providing a unique structure which overcomes the aforesaid difficulties.

SUMMARY OF THE INVENTION

This invention is a stake post panel arrangement in combination with a flat bed truck or trailer. Hollow stake post arrangements with panel entrapping walls or surfaces are provided to carry panel or wall portions on the sides and ends of a flat bed trailer and to support overhead tarpaulin bow structure.

It is a general object of the present invention to provide for a new, improved trailer stake post arrangement having inner and outer post members slidingly dovetailed together to provide for surfaces to hold the walls of the trailer and to hold the tarpaulin wall member within the post arrangement.

It is another object of this invention to provide for a stake post arrangement which comprises two extrusions of different shapes and lengths which are slid together in locking fashion and welded together to prevent relative longitudinal movement between the post extrusions.

Another object of this invention is to provide for a post arrangement whereby the outer of two extruded members forming the post may be used alone to provide for an intermediate post to support the center of a plywood wall on the side of the trailer.

Still a further object of this invention is to provide for a two-post construction of inner and outer extrusions where the inner extrusion can be used to support a tailgate board or support an intermediate cargo divider.

Further objects and advantages of the present invention will become apparent from the following detailed description, reference to the accompanying drawings wherein preferred embodiments of the present invention are shown.

BRIEF DESCRIPTION OF THE DRAWINGS

FIG. 1 is a perspective view of a trailer employing the novel stake post arrangement with vertical wall construction and tarpaulin bows;

FIG. 2 is a cross-sectional view taken along line 2—2 of FIG. 1 and illustrating the construction in part of the tarpaulin rod, the stake pocket and the stake post;

FIG. 3 is a plan view partially in section taken along line 3—3 of FIG. 1 and showing the intermediate bulkhead and side walls coupled by the stake posts;

FIG. 4 is a slightly modified arrangement of the stake post arrangement as shown in FIG. 3;

FIG. 5 is a front view of the stake post and wall portions and the stake pocket; and FIG. 6 is a plan sectional view taken along line 6—6 of FIG. 1 and showing the stake post arrangement to be used as an intermediate support for the trailer walls without using the outer extrusion member of the stake post arrangement.

DESCRIPTION OF THE PREFERRED EMBODIMENTS

Referring now to the drawings and in particular with reference to FIG. 1 there is shown a flat bed trailer 10 that has a plurality of side wall sections or panels 12 held up by a plurality of stake or rack body posts 14 which are held in stake pockets 16 which are welded onto the side beam member 18 by weld w (see FIG. 2). The front 20 of the trailer 10 is a single wall member 22 having on its outside upright reinforcing beams 24. The trailer 10 is further provided with the usual bogies 26 and landing gears 28. The rear of the trailer is provided with corner posts 14 like that shown in FIGS. 3 or 4 and carried in stake pockets 16. Longitudinally extending skid rails 30 are mounted lengthwise horizontally on the stake pockets on the sides, rear and front of the trailer. The top of the trailer is provided with tarpaulin bows 32. The tarpaulin which is not shown is secured on the bows 32 which have their rod ends 34 extending into the tops of the stake posts 14 as seen, for instance, in FIG. 2.

The construction of the stake post, stake pocket and panels is seen in FIGS. 2 and 3 wherein it is seen that the stake post 14 comprises an outer stake post member 36 and an inner stake post member 38, each of the post members dovetailing together with respect to one another whereby each post is vertically slidable with respect to the other for assembly and then the dovetailing sections 40 and 42 of each of the posts 36 and 38 respectively are welded together at their tops as seen as seen in FIG. 3 by weld w. The dovetailing sections are also welded at the bottom but this is not shown. The outer stake post member 36 is generally rectangular in cross-section but has an opening on its inner side 44 adjacent its dovetailing sections 40, the opening 46 receiving therethrough the outer end portions 48 which includes dovetailing portions 42 and tarpaulin pole or bow receiving portions 50 which are spaced apart from one another and are curved to cooperate with the curved tarpaulin bow receiving portion 52 of the outer longitudinally extending side 54 of the stake post member 36. The outer stake post member 36 is also provided with transverse sides 56 to define the generally rectangular shape. The inner stake post member 38 is generally hat-shaped and is provided with brim portion or flanges 58, transverse side portions 60, and the outer longitudinal flange portion 62 which at each of its outer ends is provided with the C-shaped dovetailing portions 48 which are also provided with a tarpaulin bow receiving portion 50. As seen in FIG. 3, the flange 58 and the transverse side portions 60 on each end of the inner post member 38 cooperate with a side portion 44a of the inner side 44 of the outer member 36 to receive and hold a side wall section or panel 12 and each side portion 60 cooperates with the longitudinal flange portion 62 of the inner post member 38 to receive and hold an intermediate or transverse bulkhead 64 which extends the width of the trailer between its side panels. The transverse sides 56 of the outer post member 36 are provided with recesses 66 for strengthening and the corners 68 between the side walls 56 and the outer longitudinal wall 54 of the outer member 36 are biased or beveled and recessed to add additional strength to the member and reduce the amount of material. The outer stake member 36 has its lower end nestled closely within the stake pocket 16 which is defined by two upright side flanges or portions 70 and an outer longitudinal side 72, these transverse sides or legs 70 being welded by welds w to the trailer longitudinally extending beams 18 which attach to the floor 76 of the trailer. The longitudinal side plate 72 at its bottom is outwardly kinked and connects with a bottom plate portion 74 which is welded to the longitudinally extending side members 18 by welding w. FIG. 2 shows the floor 76 wedged under the top flange of the longitudinal beam 18 and being supported on one of the crossmembers 78 of the trailer.

FIG. 4 shows a modified construction of the stake post 14' wherein the longitudinal wall 62' of the inner post member 38' is curved or partly tubular in shape and the outer longitudinal wall 54' of the outer post member 36' of the post 14' has an inwardly set tubular section 52' to cooperate with the tube section 62' in receiving the tarpaulin rod 34, the dovetailing of the ends of the outer post member being received in the inner recessed dovetailing sections of the inner post member in same manner as shown in FIG. 3. Further, the post 14' functions here as a corner post although it could function as a side post and, therefore, 64' represents the end bulkhead or tailgate of the trailer and, therefore, no left-handed extending side panel is required although there is a side panel 12 on the right side between the two post members 38' and 36'.

FIG. 5 is illustrative of an enlarged sectional front view of the stake pocket and rub or skid rail. FIG. 6 is like FIG. 3 but it shows the use of the outer stake post member or extrusion 36 being used as an intermediate post to support the plywood board or panel 12 where no inner stake post member 38 is used. It is noted that the front end or front wall of the trailer is fixed on the trailer floor, whereas the rear end of the trailer can be a plurality of horizontally extending vertically stacked panels that slide into the two corner posts and are further reinforced by the use of just outer post members or extrusions.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a highway vehicle of the convertible type from flat deck to side wall and tarpaulin roof,
a stake post arrangement comprising a plurality of side stake posts,
each post having an inner post member and an outer post member vertically slidably received in the inner post member in dovetailing fashion to define with the inner post member, panel groove defining walls for receiving vertically extending wall panels to form the sides of the trailer,
each inner post member and each outer post member further together forming a tarpaulin stake receiving pocket,
said inner post member being generally hatshaped and having a pair of brim flanges spaced apart from one another and directed outwardly from one another in a longitudinal direction,
said flanges each having its outer longitudinal surface adapted to engage a longitudinally extending panel,
each flange having an outwardly directed transverse panel portion spaced apart from one another and each extending outward from a respective brim flange and adapted to receive between each said transverse portion a transversely extending panel,
each transverse panel portion having a seat portion for limiting outward movement of said associated transversely extending wall panel,
said seat portion having an outer transversely extending flange portion provided with a tarpaulin stake engaging portion and a dovetailing receiving portion,
said outer post member being generally rectangular in shape and having an inner longitudinal portion having inwardly facing panel engaging longitudinal portions defining an opening for extending therethrough the transverse portions of the inner post, said panel engaging longitudinal portions being cooperative with the longitudinal surfaces of the brim flanges of the inner post member forming said groove defining walls,
said inner longitudinal portions of said outer post member further having a pair of dovetailing end portions on each side of said opening slidably receivable in the dovetailing receiving portions of said inner post member,
said outer post member further having a pair of laterally extending portions connecting with said inner longitudinal portion and having an outer longitudinal portion connecting with said laterally extending portions, said outer longitudinal portion being provided with a tarpaulin stake engaging portion for complementally forming with the tarpaulin stake engaging portions of the inner post member said tarpaulin stake receiving pocket.

2. The invention according to claim 1, and
at least one side post being located at the rear end corner of the trailer and having no panel extending longitudinally sidewise outward therefrom and a tailgate panel extending transversely therefrom,
said corner side post having its inner post member including a recess portion receiving one end of said transverse tailgate panel.

3. The invention according to claim 1, and
an outer post member spaced between two stake posts for supporting a wall panel between its ends.

4. The invention according to claim 1, and
the tarpaulin stake engaging portions of the inner and outer post members being generally arcuate in shape to accommodate a generally annularly curved shaped tarpaulin stake.

5. The invention according to claim 4, and each tarpaulin stake engaging portions of the inner and outer posts being tubular sections, the tubular section of the outer post member being spaced from the tubular sections of the inner post member and being recessed with respect to the outer longitudinal portion of the outer post member.

6. The invention according to claim 1, and said inner post member having a pair of longitudinal flanges spaced apart from one another and directed outwardly from one another in a longitudinal direction, said flanges each adapted to engage a longitudinally extending panel, each flange having an outwardly directed transverse portion spaced apart from one another and adapted to receive between each said transverse portion a transversely extending panel, said inner post member having a pair of spaced outer transversely extending flange portions each provided with a tarpaulin stake engaging portion and a dovetailing receiving portion, said outer post member having an inner longitudinal portion being cooperative with the flanges of the inner post member forming said groove defining walls, said inner longitudinal portion of said outer post member further having a pair of dovetailing end portions slidably receivable in the dovetailing receiving portions of said inner post member, said outer post member having an outer longitudinal portion being provided with a tarpaulin stake engaging portion for complementally forming with the tarpaulin stake engaging portions of the inner post member said tarpaulin stake receiving pocket.

7. In a highway vehicle of the convertible type from flat deck to side wall and tarpaulin roof, a stake post arrangement comprising a plurality of side stake posts mounted in upright position on the sides of the vehicle and extending up from the flat deck, each post having an inner post member and an outer post member vertically slidably received in the inner post member in dovetailing fashion to define, with the inner post member, panel groove defining walls, said panel groove defining walls adapted to receive said wall panels therein to form the sides of the vehicle, each inner post member and each outer post member further together forming a tarpaulin stake receiving pocket, said tarpaulin stake receiving pockets each adapted to receive therein a tarpaulin stake, said inner post member having longitudinal flanges engaging said side panels of each side of the vehicle, said inner post member having a pair of spaced outwardly transversely extending flange portions each provided with a tarpaulin stake engaging portion and a dovetailing receiving portion, said outer post member having an inner longitudinal portion being cooperative with the flanges of the inner post member forming said groove defining walls, said inner longitudinal portions of said outer post member further having a pair of dovetailing end portions slidably receivable in the dovetailing receiving portions of the inner post member, said outer post member having an outer longitudinal portion being centrally provided with a tarpaulin stake engaging portion for complementally forming with the tarpaulin stake engaging portions of the inner post member said tarpaulin stake receiving pocket.

8. The invention according to claim 7, and said highway vehicle having a transversely extending panel couplable with a pair of laterally aligned posts on opposite sides of the vehicle, each pair of spaced outwardly transversely extending flange portions of each inner post member each receiving in sandwich-like manner a respective lateral end portion of said transversely extending panel.

* * * * *